United States Patent [19]
Yamazaki et al.

[11] 3,952,840
[45] Apr. 27, 1976

[54] ELASTOMERIC BUSHING CLEARANCE DEVICE FOR A CLOSED-LOOP DISC BRAKE

[75] Inventors: Tetu Yamazaki, Yokohama; Kazuaki Shimizu, Yokosuka, both of Japan

[73] Assignee: Nissan Motor Company Limited, Yokohama, Japan

[22] Filed: Dec. 23, 1974

[21] Appl. No.: 535,681

[30] Foreign Application Priority Data
Dec. 28, 1973  Japan.................... 48-147847[U]

[52] U.S. Cl.............................. 188/71.8; 188/73.4; 188/196 P
[51] Int. Cl.²...................................... F16D 65/54
[58] Field of Search................ 188/71.8, 73.3, 73.4, 188/196 R, 196 P

[56] References Cited
UNITED STATES PATENTS

| | | | |
|---|---|---|---|
| 3,482,655 | 12/1969 | Walther | 188/73.3 |
| 3,618,714 | 11/1971 | Croswell | 188/196 P |
| 3,628,639 | 12/1971 | Daley, Jr. | 188/196 P |
| 3,712,422 | 1/1973 | Haraikawa et al. | 188/73.4 |
| 3,722,637 | 3/1973 | Kershner | 188/196 P |
| 3,844,384 | 10/1974 | Toshida et al. | 188/73.4 |

*Primary Examiner*—Trygve M. Blix
*Assistant Examiner*—Edward R. Kazenske

[57] ABSTRACT

A friction pad of a disc brake is indirectly actuated through a yoke to move between brake application and brake release positions with respect to a braking disc. Supports on the yoke each have elastomeric bushings arranged to slidingly receive a collar on a rod fixed to the stationary hydraulic cylinder so as to guide the yoke in its movements. The elastomeric bushings are so configured that the elastomeric bearings slide over the collars with less frictional resistance during brake application movement than during brake release movement.

4 Claims, 6 Drawing Figures

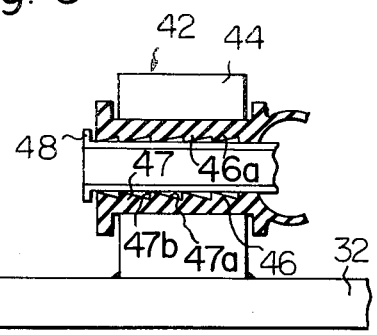
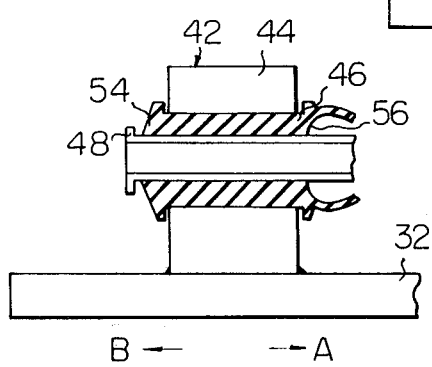
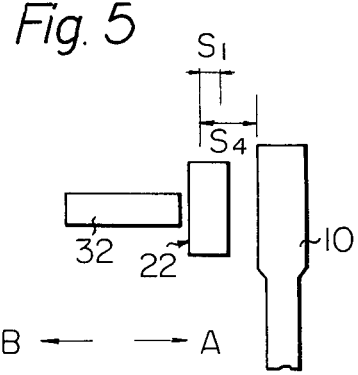
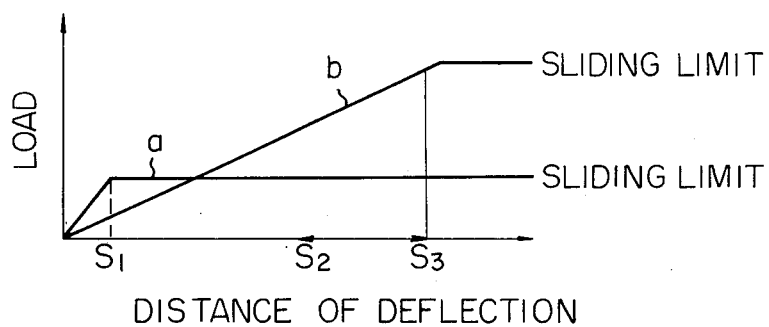

ELASTOMERIC BUSHING CLEARANCE DEVICE FOR A CLOSED-LOOP DISC BRAKE

The present invention relates generally to a vehicle disc brake, and more particularly to an improvement of guide means allowing smooth engagement of a friction pad assembly with the disc of the disc brake.

In a vehicle disc brake having a plurality of hydraulic pistons, one directly presses a friction pad assembly on a braking disc and another opposite one indirectly presses the other friction pad assembly on the same disc through a yoke when braking. It is known that the yoke is guided by guide means in a direction substantially perpendicular to the plane of rotation of the braking disc to allow smooth engagement of the indirectly pressed friction pad assembly with the braking disc. The guide means has a plurality of support members secured to the yoke, each of which members is provided with a bore therethrough. An elastomeric bushing is securely disposed in the bore and disposed around a guide rod secured to a portion of a stationary hydraulic cylinder, and adapted to slide on the guide rod with the yoke alternately in a direction when the brake is applied and in the reverse direction when the brake is released.

An object of the present invention is to provide a disc brake capable of improving brake pedal response by keeping as small as possible the clearance between the braking disc and the friction pad assembly which is indirectly pressed through a yoke by a hydraulic piston.

Another object of the present invention is to provide a disc brake having improved elastomeric bushings of guide means for guiding a yoke, the improved elastomeric bushing being arranged and constructed to slide on a stationary guide rod with the yoke in a direction for applying the brake with a relatively low friction resistance, while sliding in the reverse direction for releasing the brake with a relatively high friction resistance.

Other objects and features of the disc brake incorporating the improvement according to the present invention will become quite clear from the following description taken in conjunction with the accompanying drawings in which like reference numerals and characters are used for corresponding parts and elements throughout the accompanying drawings in which:

FIG. 3 is an enlarged cross-sectional view showing a preferred example of an elastomeric bushing employed in the disc brake shown in FIG. 1 in accordance with the present invention;

FIG. 4 is an enlarged cross-sectional view similar to FIG. 3 but showing another preferred example of the elastomeric bushing;

FIG. 5 is a diagram of assistance in explaining the operation of the invention; and FIG. 6 is a graphical representation of examples of the relationships between deflection and load of the elastomeric bushings.

Figure 1:
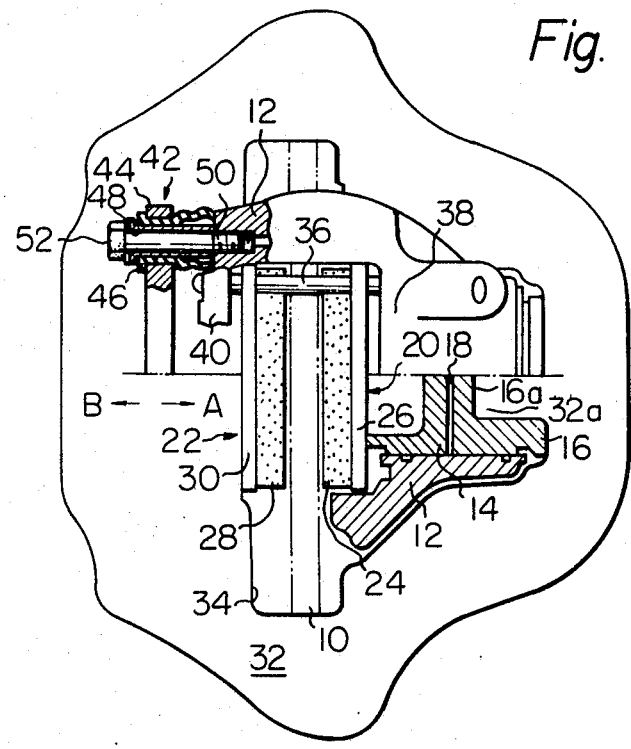
FIG. 1 illustrates a disc brake in plan view partly in section.
Figure 2:
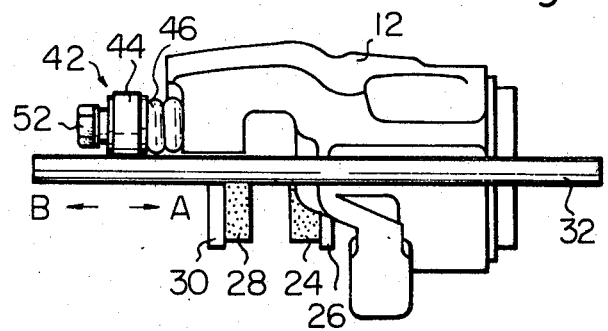
FIG. 2 is a side view of a portion of the disc brake shown in FIG. 1.

Referring now to FIGS. 1 and 2, there is shown a disc brake with a braking disc 10 mounted to rotate with a wheel (not shown) of a motor vehicle. Adjacent to a face of the braking disc 10 is disposed a stationary hydraulic cylinder 12 which is rigidly fixed to a frame or other structural part of the motor vehicle through suitable fastening means, though not shown. The stationary hydraulic cylinder 12 is open at both ends and positioned to have the axis of movement of its inner and outer pistons 14 and 16 respectively substantially parallel to the axis of the disc 10. The pistons 14 and 16 define a fluid chamber 18 therebetween. The fluid chamber 18 communicates with a master cylinder (not shown) so that fluid under pressure is supplied thereinto when the brake pedal is depressed to force the pistons 14 and 16 apart from each other.

Directly and indirectly actuated friction pad assemblies 20 and 22 are positioned adjacent to the faces of the disc 10. The directly actuated friction pad assembly 20 is interposed between the braking disc 10 and the inner piston 14, and comprises a friction pad 24 and a backing plate 26 to which the friction pad 24 is bonded or otherwise secured. The inner piston 14 is thus in abutting engagement with the inner face of the backing plate 26. The indirectly actuated friction pad assembly 22 is positioned adjacent to the opposite side of the disc 10 and comprises a friction pad 28 and a backing plate 30 to which pad 28 is secured.

The stationary hydraulic cylinder 12 and the friction pad assemblies 20 and 22 are arranged surrounded a yoke 32 which is formed of a flat plate. The yoke 32 has a suitably shaped opening 34 which accommodates an arc of the braking disc 10 and which has a projection 32a which bears against the inner wall 16a of the outer piston 16.

Two guide pins 36 (one of the two shown) pass through holes (not shown) formed through the friction pad assemblies 20 and 22, and each pin 36 has one end fitted into a blind bore (no numeral) formed in a cross member 38. The pins 36 pass through holes (no numeral) formed in another cross member 40.

As shown, the disc brake also has two guide means 42 (one of the two shown) to guide the yoke 32 in a direction substantially perpendicular to the plane of the disc 10 to allow smooth engagement of the friction pad assembly 22 and the disc 10. Each of the guide means includes a support 44 which is fixed to the yoke 32 in a suitable manner such as by welding and is provided with a bore (no numeral) therethrough. Within each bore of the supports 44 is tightly disposed with a force fit a bushing 46 which is made of an elastomeric material such as rubber. A cylindrical collar 48 is slidably received in the bushing 46 and secured around the peripheral surface of a guide rod 50. The guide rod 50 is secured on its one end to a portion of the stationary hydraulic cylinder 12 by being tightly fitted thereinto. The collar 48 is secured around the peripheral surface of the guide rod 50 by being securely interposed between a bolt head 52 of the guide rod 50 and a portion of the stationary hydraulic cylinder 12.

In accordance with a feature of the present invention, the elastomeric bushing 46 is arranged and constructed to slide on the outer surface of the collar 48 in a direction of the arrow A for applying the brake with a lower friction resistance than that in the reverse direction of the arrow B for releasing the brake.

A preferred example of the elastomeric bushing is illustrated in FIG. 3. as shown, the bushing 46 has on its inner peripheral surface a plurality of annular ridges 46a. Each of the ridges extends in the direction to surround the outer peripheral surface of the cylindrical collar 48 and pressingly contacts the outer peripheral surface of the cylindrical collar 48. Each ridge is in the form of sawtooth 47 in section which is formed by a first side 47a facing to the direction A in which the bushing moves for applying the brake and a second side 47b facing to the reverse direction B in which the bushing moves for releasing the brake. The two sides 47a and 47b form at their crossing point the apex of the sawtooth 47. It should be noted that the first side 47a is longer than the second side 47b. With this arrangement of bushing 46, the yoke 32 is moved in the direction of the arrow A with a relatively low resistance which results from a relatively low friction resistance between the bushing 46 and the stationary collar 48 when the brake is applied, while, when moved in the reverse direction of the arrow B a relatively high friction resistance is developed when the brake is released.

Another preferred example of the bushing is illustrated in FIG. 4. As shown, the bushing 46 has a conical projecting portion 54 on its one end facing to the direction B in which the bushing moves for releasing the brake, and a conical recess portion 56 on its other end facing to the another direction A in which the bushing 46 moves for applying the brake. The portions 54 and 56 are both outside of the bore of the support 44. The conical projecting portion 54 is constructed to be fluttered by sliding on the outer surface of the collar 48 and therefore to cause in cooperation with the conical recess portion 56 a relatively low frictional resistance when sliding on the collar 48 in the direction of the arrow A, while it causes a relatively high friction resistance when sliding in the direction of the arrow B. As is apparent from the foregoing description, also in this instance, the same results as those of FIG. 2 are obtained.

Effects resulting by the bushing 46 according to the present invention will be further illustrated with reference to FIGS. 5 and 6. Where a deflection characteristic of the bushing 46 is $a$ as shown in FIG. 6 when it is sliding on the collar 48 in the directions of both the arrows A and B and the indirectly actuated friction pad assembly 22 is subjected to an action of being pushed back in the reverse direction of that for braking or "knock-back" a distance $S_4$ as shown in FIG. 5, the friction pad assembly 22 can not be restored in the direction of arrow A to the amount of the distance $S_4 - S_1$ because the sliding limit in the characteristic $a$ is relatively low as shown in FIG. 6. In order to compensate for the amount of the distance, it is required to increase the amount of braking fluid corresponding to the distance $S_4 - S_1$. Accordingly, it is preferable that the bushing 46 has a greater deflection distance and a higher effective friction resistance when sliding on the collar 48 in the direction of the arrow B.

On the contrary, where the deflection characteristic of the bushing 46 is $b$ as shown in FIG. 6 when sliding in the directions of the arrows A and B as mentioned above, an initial clearance between the friction pad 28 and the braking disc 10 will be a distance $S_3$ as shown in FIG. 6. If, in addition, the amount of the deflection of the yoke 32 is a distance $S_2$ as shown in FIG. 6 when the brake is applied, the clearance will become a distance $S_3 + S_2$ when the brake is released. It is required to increase the amount of the brake fluid to be used corresponding to the distance $S_3 + S_2$ when braking, which results in a decrease of the braking response. Accordingly, it is preferable that the bushing 46 has a smaller deflection distance and a lower friction resistance when sliding on the collar 48 in the direction of the arrow A.

What is claimed is:
1. A disc brake of a wheeled vehicle, including:
a rotatable braking disc;
a stationary hydraulic cylinder having inner and outer pistons slidable in opposite directions which are substantially parallel to the axis of said braking disc, said pistons defining a fluid chamber therebetween into which fluid under pressure is supplied when braking;
directly and indirectly actuated friction pad assemblies positioned adjacent to opposite faces of said braking disc, said directly actuated friction pad assembly being in abutting engagement with said inner piston which forces it against said braking disc when said inner piston is moved by said fluid;
a yoke movable in a direction parallel to said axis of said braking disc by said outer piston to move said indirectly actuated friction pad assembly; and
two guide means for guiding said yoke in said direction parallel to said axis of said disc to allow smooth engagement of said indirectly actuated friction pad assembly with said braking disc, each of said guide means including a support member provided with a bore therethrough and fixed to said yoke, a guide rod secured to a portion of said stationary hydraulic cylinder and passing through the bore of each said support member, said guide rod securely provided with a cylindrical collar around the periphery of said guide rod, the improvement comprising an elastomeric bushing tightly disposed between the inner surface of said bore of each said support member and the outer peripheral surface of said cylindrical collar and secured to each said support member, each said elastomeric bushing being, at its portion contacting the outer peripheral surface of said cylindrical collar, configured to slide on the outer peripheral surface of said cylindrical collar, in a direction for applying the brake, with a lower friction resistance than that in the reverse direction for releasing the brake.

2. A disc brake of a wheeled vehicle, including:
a rotatable braking disc;
a stationary hydraulic cylinder having inner and outer pistons slidable in opposite directions which are substantially parallel to the axis of said braking disc, said pistons defining a fluid chamber therebetween into which fluid under pressure is supplied when braking;
directly and indirectly actuated friction pad assemblies positioned adjacent to opposite faces of said braking disc, said directly actuated friction pad assembly being in abutting engagement with said inner piston which forces it against said braking disc when said inner piston is moved by said fluid;
a yoke movable in a direction parallel to said axis of said braking disc by said outer piston to move said indirectly actuated friction pad assembly in a first direction for a braking application against said braking disc and in a second direction, reverse to said first direction, for releasing said pad assembly from its braking application; and
two guide means for guiding said yoke in said direction parallel to said axis of said disc to allow smooth engagement of said indirectly actuated friction pad assembly with said braking disc, each of said guide means including a support member provided with a bore therethrough and fixed to said yoke, a guide rod secured to a portion of said stationary hydraulic cylinder and passing through the bore of each said support member, said guide rod securely provided with a cylindrical collar around the periphery of said guide rod, and an elastomeric bushing tightly disposed between the inner surface of said bore of each said support member and the outer peripheral surface of said cylindrical collar and secured to each said support member, each said elastomeric bushing having on its inner peripheral surface a plurality of parallel ridges, each said ridge extending in the direction to surround the outer peripheral surface of said cylindrical collar and pressingly contacting at an apex thereof, the outer peripheral surface of said cylindrical collar, each said ridge being in the form of a sawtooth in section which is formed by a first side facing in said first direction and a second side facing in said second direction said two sides being joined together and defining at their point of joinder said apex of said ridge, the first side being longer than the second side.

3. A disc brake as claimed in claim 2, in which said ridges of said elastomeric bushing are formed annularly on the inner peripheral surface of the bushing.

4. A disc brake of a wheeled vehicle, including:
a rotatable braking disc;
a stationary hydraulic cylinder having inner and outer pistons slidable in opposite directions which are substantially parallel to the axis of said braking disc, said pistons defining a fluid chamber therebetween into which fluid under pressure in supplied when braking;
directly and indirectly actuated friction pad assemblies positioned adjacent to opposite faces of said braking disc, said directly actuated friction pad assembly being in abutting engagement with said inner piston which forces it against said braking disc when said inner piston is moved by said fluid;
a yoke movable in a direction parallel to said axis of said braking disc by said outer piston to move said indirectly actuated friction pad assembly in a first direction for a braking application against said braking disc and in a second direction, reverse to said first direction, for releasing said pad assembly from its braking application, and
two guide means for guiding said yoke in said direction parallel to said axis of said disc to allow smooth engagement of said indirectly actuated friction pad assembly with said braking disc, each of said guide means including a support member provided with a bore therethrough and fixed to said yoke, a guide rod secured to a portion of said stationary hydraulic cylinder and passing through the bore of each said support member, said guide rod securely provided with a cylindrical collar around the periphery of said guide rod, and an elastomeric bushing tightly disposed between the inner surface of said bore of each said support member and the outer peripheral surface of said cylindrical collar and secured to each said support member, each said elastomeric bushing having a conical projecting portion on its one end facing in said second direction, and a conical recess portion on its other end facing in said first direction, both said portions being outside of the bore of each said support member.

* * * * *